United States Patent [19]

Bauer et al.

[11] Patent Number: 4,788,810
[45] Date of Patent: Dec. 6, 1988

[54] DEVICE FOR LOADING AND UNLOADING X-RAY FILM CASSETTES

[75] Inventors: Walter Bauer, Munich; Manfred Schmidt, Kirchheim, both of Fed. Rep. of Germany

[73] Assignee: Agfa-Gevaert AG, Leverkusen, Fed. Rep. of Germany

[21] Appl. No.: 75,031

[22] Filed: Jul. 17, 1987

[30] Foreign Application Priority Data

Jul. 25, 1986 [DE] Fed. Rep. of Germany ....... 8619938

[51] Int. Cl.4 ............................................... B65G 65/04
[52] U.S. Cl. .................................. 53/266 R; 414/404; 414/411
[58] Field of Search ................ 53/237, 238, 244, 249, 53/266, 67, 504, 381 R, 382, 540, 167; 221/23.1; 414/403, 404, 411; 271/9, 303, 238, 240

[56] References Cited

U.S. PATENT DOCUMENTS

| | | | |
|---|---|---|---|
| 3,075,080 | 1/1963 | Sano | 53/266 C |
| 3,150,263 | 9/1964 | Catlin | 53/266 C |
| 3,589,710 | 6/1971 | Yagi | 271/171 X |
| 4,227,089 | 10/1980 | Plessers et al. | 53/266 C |
| 4,354,336 | 10/1982 | Azzaroni | 53/382 X |
| 4,480,423 | 11/1984 | Muller | 53/266 C |
| 4,514,958 | 5/1985 | Hoorn | 53/382 X |
| 4,527,320 | 7/1985 | Deconinck | 53/266 C X |
| 4,590,738 | 5/1986 | Hösel et al. | 53/266 R |

FOREIGN PATENT DOCUMENTS 3232187 2/1985 Fed. Rep. of Germany .

Primary Examiner—Horace M. Culver
Attorney, Agent, or Firm—Michael J. Striker

[57] ABSTRACT

A device for loading and unloading X-ray film cassettes into a light-sealed compartment includes a device for opening a lid of the cassette inserted in the compartment. The lid-opening device comprises a motor-driven control disc which via a crank rod shifts a support carrying a cassette positioning device, and a lid-opening hook which can swing in two normal directions and cooperates with the lid of the cassette to open the latter.

9 Claims, 3 Drawing Sheets

DEVICE FOR LOADING AND UNLOADING X-RAY FILM CASSETTES

BACKGROUND OF THE INVENTION

The present invention relates to a device for loading and unloading X-ray film cassettes.

Devices for loading and unloading X-ray film cassettes of the foregoing type have been known. Such a device comprises a subframe which includes a light-tight closable compartment for receiving a cassette which has a pivotable lockable lid, means for the insertion and removal of the X-ray film cassette into and from the compartment, a device for positioning cassettes of all available formats, an unlocking device coupled with the positioning device for locking and releasing the lid of the cassette, a support movable with the cassette from the first position to the second position and supporting the positioning device and the unlocking device, means for driving the support, and a device for opening the lid of the cassette during the movement of the cassette and support from the first to the second position.

Such a device has been disclosed, for example in DE-PS No. 32 32 187. In such a device, a necessary adjustment of the movements of the cassette and support and the device for opening the cassette lid involves a great deal of expense.

SUMMARY OF THE INVENTION

It is an object of the present invention to provide an improved device for loading and unloading X-ray film cassettes.

It is a further object of the invention to provide a simple control device for adjusted movements of the support and lid-opening device.

These and other objects of the invention are attained by a device for loading and unloading X-ray film cassettes each having a pivotable closable lid, the device comprising a base having a light-tight closable compartment accommodating a cassette, transporting means for inserting and removing said cassette from said compartment, positioning means for positioning a cassette edge for the cassettes of all formats; a movable support; releasing means coupled to said positioning means for lid locking and a closing means for the lid which are positioned on said support movable jointly with the cassette in a transport direction from a first position to a second position; drive means for moving said support; and lid-opening means for opening said lid during the movement of said support with said cassette from the first position to the second position, said drive means for said support and said lid-opening means including a motor-driven control disc, a shiftable crank rod rotatably eccentrically supported on said disc, and a plate guided on said crank rod and having an opening hook cooperating with the lid to open the lid.

The support may be formed by a turnable guide rod, extending transversely to the transport direction, said rod having ends, said drive means for said support including a toothed piece at each end of said guide rod and gears each meshing with a respective toothed piece and being supported on said guide rod, said crank rod having an end supported on the end of said guide rod such that upon rotation and shifting of the end of said crank rod said gears roll on said toothed pieces and said guide rod executes a parallel motion in the transport direction.

The control disc may include an eccentrical pin engaged in a cam slot of said plate.

The plate may have a control pin, said control disc having a cam piece, said pin lying on said cam piece in a force-locking fashion.

The planes of said control disc and said plate are parallel to narrower sides of the cassette extending in the transport direction, said hook being tiltably supported on said plate about a pivot axis positioned parallel to said planes and tiltably supported about a further pivot axis transversal to said planes; and further including springs and stops, said hook being drawn by a respective spring towards a respective stop in each tilting direction.

The one pivot axis may croos said further pivot axis.

The plate may have a portion which carries one of said stops and is pivotably supported about said further pivot axis on said plate and is connected therewith by one of said springs, said pivot axis together with said hook being supported on said portion and being connected therewith by another of said springs.

The hook may be a double-arm and has one end cooperating with said lid, said one end having a downwardly directed oblique surface, said hook having at another end thereof an angled portion said plate having a control recess in which said angled portion is engageable.

Due to the device according to the invention, namely due to the provision of the control disc in the drive means, a synchronous and adjustable movement of the support and the lid-opening means is ensured. Such an arrangement also permits that with the non-released cassette lid or with the insertion of the cassette which is not to be processed into the device the lid-opening hook provided with three degrees of freedom does not engage with the lid so that no damage either to the device or to the cassette can occur.

The hook may have a conical projection extending parallel to said pivot axis, said base having an oblique surface, said projection engaging said oblique surface in an initial position of said plate, with said another of said springs being stressed in one position of said hook pivoted from said lid, said oblique surface being formed so that said conical projection can slide off said oblique surface upon pivoting of said plate.

The novel features which are considered as characteristic for the invention are set forth in particular in the appended claims. The invention itself, however, both as to its contruction and its method or operation, together with additional objects and advantages thereof, will be best understood from the following description of specific embodiments when read in connection with the accompanying drawing.

BRIEF DESCRIPTION OF THE DISCLOSURE

DETAILED DESCRIPTION OF THE PREFERRED EMBODIMENT

Figure 1:
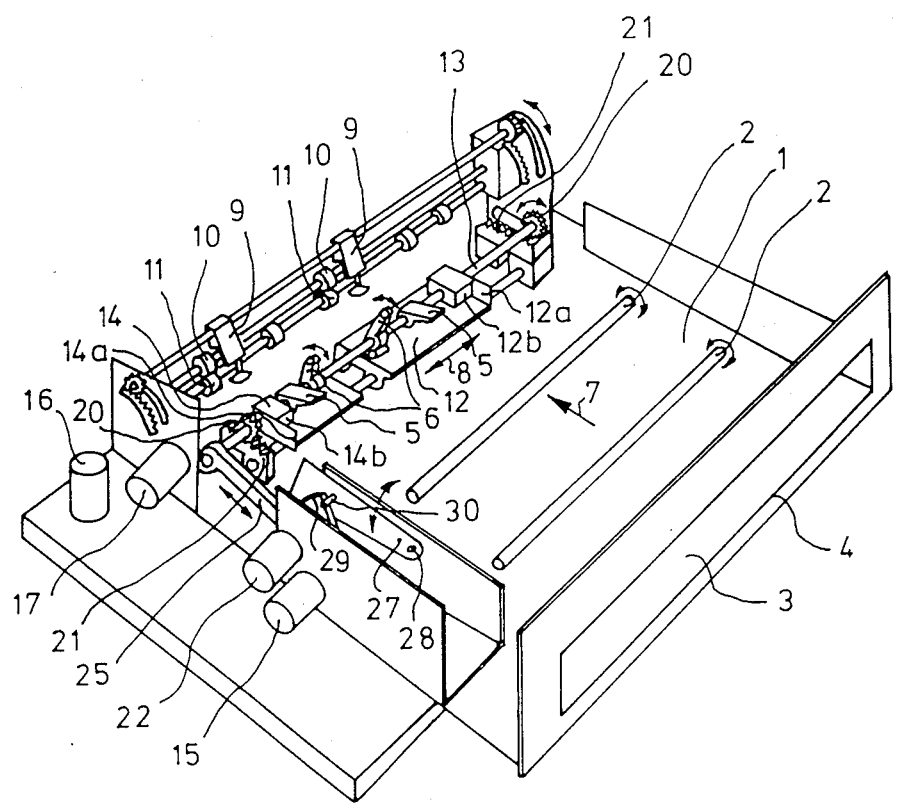
FIG. 1 is a perspective view of the cassette-loading-and-unloading device according to the invention.

Referring now to the drawings in detail, and firstly to FIG. 1 thereof it should be noted that only those structual components which are important to the present invention are shown whereas conventional parts of the device for loading and unloading x-ray film cassettes have been omitted for the sake of clarity. Reference numeral 1 designates a compartment of a base or subframe for accommodating a cassette; reference numeral 2 denotes transporting means for the insertion and withdrawal of the cassette. The cassette transporting means can be formed by transport rollers positioned at the bottom of compartment 1. Reference numeral 3 designates a schematically shown means for a light-sealed locking of an insertion opening 4 of compartment 1. At the front side of the device is positioned conventional means 5 and 6 for releasing of the cassette as will be described herein below. For a repeated locking of the cassette thesemeans can operate so that a slide 5 which has a non-shown toothing be engaged with a locking bar of the cassette and then actuate the locking bar by moving transversely to the cassette transport direction 7 so that the cassette would spring out, for example under the action of weak springs. Rotatable cams 6 serve the purpose of a complete locking of the lid after a new cassette has been loaded into the compartment 1. A pair of releasing and locking means 5, 6 must be displaceable in the directions 8 transversal to the direction 7 of the insertion of the cassette so that the releasing and locking device would be automatically adjustable to various sizes of the cassettes utilizable in the device of the present invention. Above and/or at the devices 5, 6 for releasing and locking a cassette inserted in the compartment 1, are arranged conventional means 9, 10, 11 for the removal of a film sheet from the cassette as well as for the insertion of a new film sheet into the cassette. This loading-and-unloading means comprises substantially controlled suckers 9 and corresponding transport roller pairs. Also a film storage magazine (non-shown) is provided in the known fashion, which magazine contains films of different formats which are loaded into the cassettes adapted to such different formats. Furthermore, an intermediate magazine for collecting films removed from the cassettes is provided in the known manner (also not shown). Such an intermediate magazine can be connected directly to a film developing machine. For the drive of the transport device 2, suckers 9 and transport means 10, 11 are provided in the known fashion with electric motors 15, 16, 17.

The determining of the format of the given cassette and selection and feeding of a new film take place automatically after an automatic measurement of at least one side of the cassette. When two types of the cassette are to be used in the loading-and-unloading apparatus which are equal with the cassette side measured or are very close to the same, then also the vertical cassette dimension is automatically measured and the format of the cassette is determined by two sides perpendicular to each other. Before the determination of the format of the given cassette the latter must be precisely positioned.

Reference numeral 18 designates the cassette. A possible positioning device with a clamping lid 19 will be now described in detail. This positioning device is operated to position a vertical front cassette side 18a in the direction of the insertion 7. Thereby a displacement device for transversal displacement to the direction 7 is required. This displacement device must be reciprocally movable in the directions of arrows 8. This transversal displacement device includes a clamping jaw 12 formed as an angular piece 12a, 12b which, at the same time, carries moveable parts 5, 6. The latter are movably supported on a transversal rotational rod 13 in respect to the non-rotational clamping jaw 12. Devices 5, 6 are shown in FIG. 1 in the intermediate position. The clamping jaw 12 is displaceable relative to the transversal direction 8, in respect to a stationary clamping jaw 14 formed also by an angular or right-angled piece 14a, 14b. Arms 14a, 14b thus form a lateral and a front-side stop or abutment for the cassette 18, 19 transported by means of transport rollers 2 into compartment 1. The two clamping jaws 12, 14 are arranged on the rod or bar 13 so that arms 12b and 14b are in alignment with each other. The cassette movable against stops 14a, 14b is merely clamped by the movable clamping jaw 12 and positioned thereby. The cassette transported between the clamping jaw 14 and the movable clamping jaw 12 in the initial position is, upon the displacement of the clamping jaw 12 moved under an additioanl action of the further rotating transport rollers 2, towards the stops 14b, 12b and aligned between arms 14a, 12a. Switch contacts are provided at the arms 14b, 12b or, with the large cassettes, between those arms. The switch contacts switch on a non-shown drive for the movable clamping jaw 12 upon the occurrence of a new inserted cassette 18. The switch can be, for example, a light barrier switch or a microswitch. In the initial position of the clamping jaw 12, is provided, for example a flap in the measuring range of the ligh-barrier switch or the like, by means of which a counter cooperating with a comparator is switched on when the movement of the clamping jaw 12 starts. The structures of the counter and comparator as well as the switch are not of importance for this invention.

The device illustrated in FIG. 1 is designated so that after the positioning and determination of the format of the inserted cassette 18, 19 the latter together with the support or rod 13 for structural components 5, 6, 12, 14 is moved further, on the one hand by a further rotation of the transport rollers 2 and, on the other hand, by shifting the support 13 in the direction of arrow 7. During this movement the locking means for the cassette lid 19 is released by a known control by means of the cassette releasing device 5 so that lid 19 can yield under the action of springs. During the corresponding movement in the opposite direction for the discharge of the newly loaded cassette, lid 19, after the release of its lock, will be pushed again by slide 5. During the insertion movement of the cassette 18, 19 but after the lid release and before reaching the loading-and-unloading position, the released lid 19 is further opened so that the film removal and repeated loading of the cassette are possible. The proposed device ensures a simple mechanical coordination of the transport device for the support 13 and the control of the device for opening the lid 19.

Support 13 is therefor formed, as mentioned above as a turnable rod on which are supported elements 5, 6, 12, 14 so that the latter can take definite, e.g. certain positions relative to the apparatus by a mechanical control means or supporting means. The support arrangement 13 with elements 5 and 6 is known and disclosed, for example in DE-PS No. 32 32 187 corresponding to U.S. Pat. No. 4,590,738. At the ends of the guide or supporting rod 13, are secured gears 20, each engaged with a respective rack 21 extending in the transport direction 7. Both gears 20 as well as two racks 21 are identical to each other so that, upon the rotation of one of two gears 20 and/or the rod 13 the other gear 20 is taken along and rod 13 or the parts 5, 6, 12 and 14 supported thereon execute a parallel shifting in the transport direction 7. The drive of rod 13 is performed by an electric motor 22 or its drive pinion 23 which is in engagement with a control disc 24 and drives the latter. A crank rod 25 is eccentrically supported on the control disc 24. The other end 25a of the crank rod 25 is connected near gear 20 with the end of rod 13. If, after the positioning of the inserted cassette 19, 20 motor 22 is switched on by the known control, the control disc 24 due to the translation of the slow rotation and the rotating end 25a of the crank rod 25 will be shifted in the transport direction 7 and rod 13 will turn whereby gears 20 will roll on the respective racks 21 by the same amount. Thus a sliding guidance for the rod 13 can take place by means of gears 20 and racks 21. Such a motion at the first rack 21 by the slide 5 results in the release of the cassette lid 19.

After the release of the lid 19 this lid should be lifted to be sufficiently open. The lifting process must start at the predetermined position of rod 13 moved by the crank rod 25 and end at a further position before an automatic switching off the motor 22. A simple mechanical control of the device 26 for opening the lid 19 is thus possible because its movement derives from the crank rod 25 or the drive disc 24.

Figure 2:
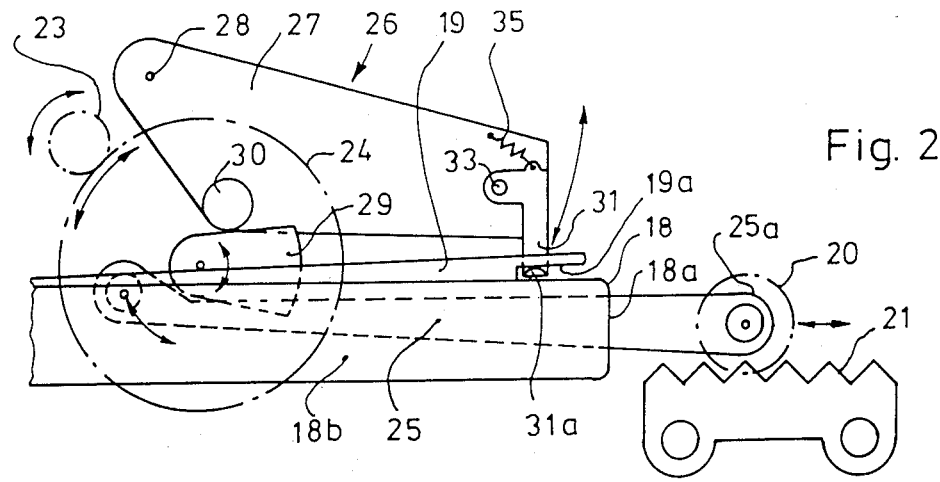
FIG. 2 is a schematic side view of the device for opening the lid of the cassette of the apparatus of FIG. 1 before the beginning of the lid opening.
Figure 3:
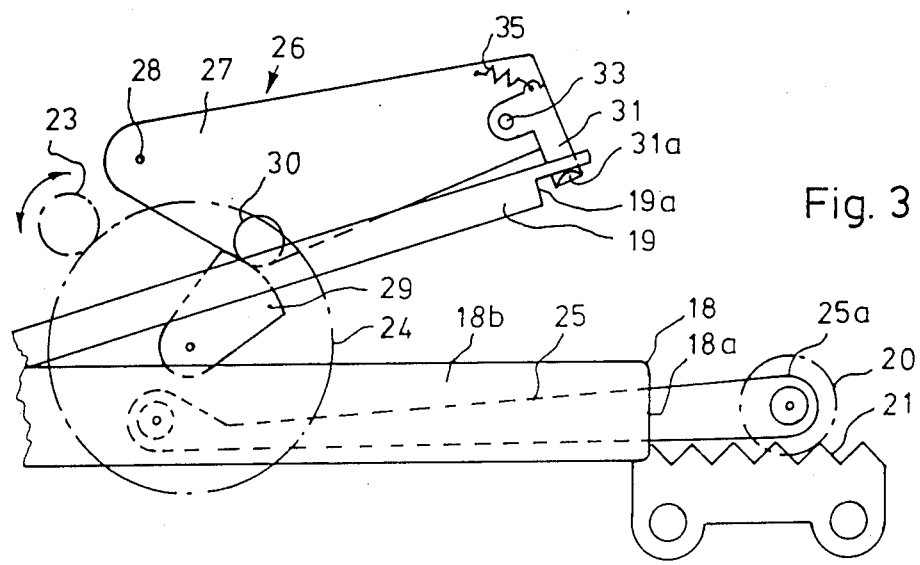
FIG. 3 is a schematic side view of the device of FIG. 2 with the lid opened.
Figure 4:
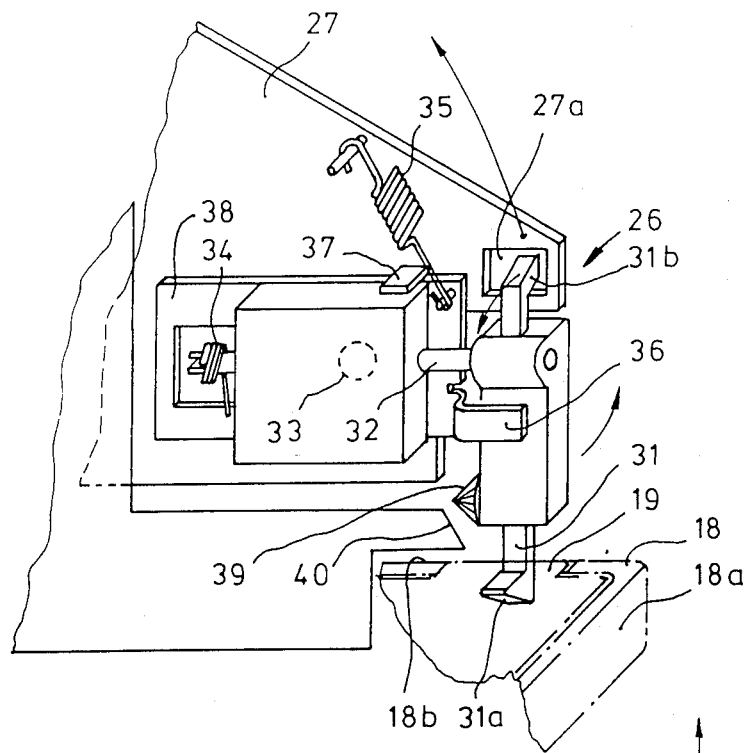
FIG. 4 is a perspective detailed view of the device of FIG. 2.

The planes of the control disc 24 and plate 27 (FIGS. 2 to 6) of the lid-opening device 26 are parallel to the cassette narrow side 18b extending in the direction of transporting 7. Plate 27 is pivotably supported about a pivot axis 28 which is fixed with the base of the device. The lid opening device 26 further includes cams 29, 30 forcibly guided between plate 27 and control disc 24. The cam 29 and cam pin or follower 30 cooperating with the latter can be formed by an eccentric pin on the control disc 24 and by a cam slot in the plate 27, respectively. According to the exemplified embodiment the eccentrically positioned control pin 30 of plate 27 is engaged in a force locking manner with the cam 29 of disc 24, which cam is formed in accordance with a desired movement, whereby the non-shown spring produces the force locking engagement or such a force-locking engagement can be ensured by the force of gravity. Upon the movement of the control disc 24, and also during the further transportation of the cassette 18 within the device in the direction 7, plate 27 is lifted in the counter clockwise direction in FIG. 2 and 3 or in the clockwise direction in FIG. 1.

The free end of plate 27 lying near the cassette side 18a supports an opening hook 31 which can be engaged in a recess 19a of the lid 19, which is accessible at the side 18b of the closed cassette. The hook 31 is supported on the plate 27 so that hook 31 can tilt about a pivot axis 33 which is normal to the plane of plate 27. Hook 31 is also biased by springs 34, 35 (FIG. 4) against respective stops 36, 37. Thereby such a support is provided that a plate piece 38 pivotally positioned on plate 27 about the further pivot axis 33 is clamped or tensioned together with the plate by spring 35, and the pivot axis 32 together with opening hook 31 is supported on the plate piece 38, and is clamped or tensioned with this plate piece by the other spring 34. The opening hook itself is formed as a two-arm element. The end of the opening hook 31 cooperating respectively with the cassette lid 19 or the recess 19a has a sloped or inclined surface 31a directed downwardly from the lid 19. The other end of the opening hook 31 has an angled portion 31b which is brought into engagement with a control recess 27a formed in the plate 27. Finally, an oblique surface is provided on the opening hook 31 parallel to the pivot axis 32. The oblique surface is formed preferably by a conical piece or projection 39 which engages in the non-operative or initial position of plate 27 a control surface 40 which is stationary or housing-fixed under the clamping action of the other spring 34 in the position of the opening hook 31 pivoting away from the cassette narrow side 18b. The housing-fixed control surface 40 is thereby arranged and formed such that the conical piece 39 can upon pivoting of the plate 27 upwardly, slide off the control surface 40.

The mode of operation of the lid opening device 26 is as follows:

If, after the positioning of the cassette 18, 19, the control disc 24 is rotated the opening hook 31 is firstly pivoted, by means of the control surface 40 and the conical piece 39 from the adjacent side 18b of the cassette. The end 31b of the opening hook is positioned against the control recess 27a. The support 13 has been already shifted in the transport direction 7, and the locking of the lid is released by means of the releasing device 5 shown in Fit. 1. If this motion phase is reached the plate 27 is also pivoted about the angular piece upwardly so that the conical piece 39 is pulled down by the control surface 40. The opening hook 31, 31a falls into the recess 19a of the released lid 19, while the angled end 31b is in the recess 27a. Upon further rotation of the control disc 24 the support 13 is further shifted and the opening hook 31 together with the lid 19 are further pivoted upwardly until they reach the position for the unloading of the cassette. After a renewed loading of the cassette the entire process is executed in the reverse fashion until the hook 31, 31a is brought by the control surface 40 again into contact with the lid 19, and the lid is pushed back by the locking device 6.

Figure 5:
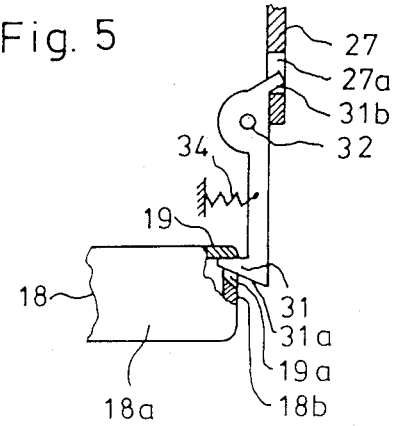
FIG. 5 and 6 are partial side views of the device of FIG. 2 in two different positions when a non-released cassette is available.
Figure 6:
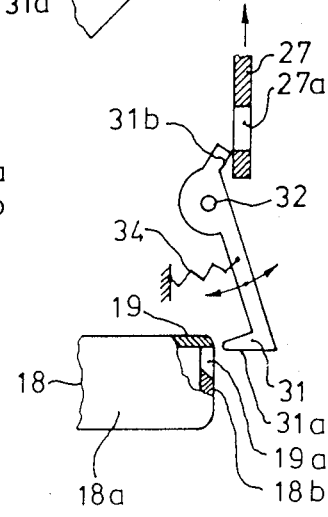

If, for example the cassette inserted into the compartment 1 has not been intended for processing in the device and its lid is not releaseable or for any other reasons the release of the lock of the lid is discontinued the opening hook 31, 31a is engaged in accordance with the respective motion stage, in the lid recess 19a as shown in FIG. 5. The lid 19a can not, however be lifted then so that firstly the spring 35 is stressed, and the plate piece 38 together with hook 31 are pivoted relative to the plate 27. Thereby the angled portion 31b which is positioned in the recess 27a will be pulled from the latter by the lower edge of the control recess 27a, as could be clearly seen from the comparison of FIGS. 5 and 6. The hook 31, 31a, 31b will be therefore pivoted from the narrow side 18b of the cassette and from the lid recess 19a (FIG. 6). Thus no damage could be done to the cassette that has not been unlocked by device 26 if such a cassette were inserted into compartment 1 by mistake. It is also possible to connect the entire process with an alarm device which would indicate any disturbance occurring. The angled hook portion 31b engageable in the control recess 27a and the control recess 27a independently from hook portion 31b could each be provided with an electrical switch which would release an alarm device during the actuation of only the control recess 27a. The sloped surface 31a brings about the additional advantage, which resides in that the hook 31 could be engaged in the lid recess 19a only when small height tolerances are provided. Eventually both ends 31a and 31b of the hook can be also formed in the direction of elongation of hook 31 normal to both axes 32 and 33 resilient relative to each other to be pressed together in the direction opposite to that shown in FIG. 4.

It will be understood that each of the elements described above, or two or more together, may also find a useful application in other types of devices for loading and unloading x-ray film cassettes differing from the types described above.

While the invention has been illustrated and described as embodied in a device for loading and unloading x-ray film cassettes, it is not intended to be limited to the details shown, since various modifications and structural changes may be made without departing in any way from the spirit of the present invention.

Without further analysis, the foregoing will so fully relveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a device for loading and unloading X-ray film cassettes each having a pivotable closable lid, the device comprising a base having a light-tight closable compartment accommodating a cassette, transporting means for inserting and removing said cassette from said compartment, positioning means for positioning a cassette edge for the cassettes of all formats; a movable support; releasing means coupled to said positioning means for locking the lid and a closing means for the lid which are positioned on said support movable jointly with the cassette in a transport direction from a first position to a second position; drive means for moving said support; and lid-opening means for opening said lid during the movement of said support with said cassette from the first postion to the second position, the improvement comprising said drive means for said support driving said lid opening means and including a motor-driven control disc (24), a shiftable crank rod (25) for shifting said support (13) and being rotatably eccentrically supported on said disc, and a plate (27) forcibly guided on said crank rod and having an opening hook (31) cooperating with the lid to open the lid.

2. The device defined in claim 1, wherein said support is formed by a turnable guide rod (13) extending transversely to the transport direction, said rod having ends, said drive means for said support including a toothed piece (21) at each end of said guide rod and gears (20) each meshing with a respective toothed piece (21) and being supported on said guide rod, said crank rod (25) having an end supported on the end of said guide rod such that upon rotation and shifting of the end of said crank rod (25a), said gears roll on said toothed pieces (21) and said guide rod executes a parallel motion in the transport direction.

3. The device as defined in claim 1, wherein said control disc includes an eccentrical pin engaged in a cam slot of said plate (27).

4. The device as defined in claim 1, wherein said plate has a control pin (30), said control disc having a cam piece (29), said pin lying on said cam piece in a force-locking fashion.

5. The device as defined in claim 1, wherein planes of said control disc (24) and said plate (27) are parallel to narrower sides of the cassette extending in the transport direction (7), said hook being tiltably supported on said plate (27) about a pivot axis (32) positioned parallel to said planes and tiltably supported about a further pivot axis (33) transversal to said planes; and further including springs (34, 35 and stops (36, 37), said hook being drawn by a respective spring towards a respective stop in each tilting direction.

6. The device as defined in claim 5, wherein said pivot axis (32) crosses said further pivot axis (33).

7. The device as defined in claim 6, wherein said plate has a portion (38) which carries one of said stops (36) and is pivotably supported about said further pivot axis (33) on said plate and is connected therewith by one of said springs (35), said pivot axis (32) together with said hook (31) being supported on said portion (38) and being connected therewith by another of said springs (34).

8. The device as defined in claim 7, wherein said hook is a double-arm and has one end (31a) cooperating with said lid, said one end having a downwardly directed oblique surface, said hook having at another end thereof an angled portion (31b), said plate having a control recess (27a) in which said angled portion (31b) is engageable.

9. The device as defined in claim 8, wherein said hook has a conical projection (39) extending parallel to said pivot axis (32), said base having an oblique surface (40), said projection engaging said oblique surface in an initial position of said plate (27) with said another of said springs (34) being stressed in one position of said hook pivoted from said lid, said clamped surface (40) being formed so that said conical projection (39) can slide off said oblique surface upon pivoting of said plate (27).

* * * * *